United States Patent [19]

Kanemura

[11] Patent Number: 4,734,712
[45] Date of Patent: Mar. 29, 1988

[54] RECORDING APPARATUS
[75] Inventor: Shoji Kanemura, Kawasaki, Japan
[73] Assignee: Canon Kabushiki Kaisha, Tokyo, Japan
[21] Appl. No.: 931,966
[22] Filed: Nov. 24, 1986

Related U.S. Application Data
[63] Continuation of Ser. No. 704,931, Feb. 25, 1985, abandoned.

[30] Foreign Application Priority Data
Feb. 29, 1984 [JP] Japan .................................. 59-35961

[51] Int. Cl.⁴ ............................................. G01J 15/00
[52] U.S. Cl. ................................ 346/76 PH; 400/120
[58] Field of Search ............ 346/76 PH; 214/216 PH; 364/518–519; 400/120; 250/317.1, 318

[56] References Cited
U.S. PATENT DOCUMENTS
4,070,587 1/1978 Hanakata ............................ 307/141
4,309,712 1/1982 Iwakura ................................ 346/76
4,415,908 11/1983 Sugiura ................................ 346/76
4,464,669 8/1984 Sekiya et al. .................... 346/76 PH Primary Examiner—Arthur G. Evans
Attorney, Agent, or Firm—Fitzpatrick, Cella, Harper & Scinto

[57] ABSTRACT

A recording apparatus for recording a pattern by a plurality of dots comprises: discriminating means for discriminating whether or not the dot which exists in the dot series to be recorded next is located obliquely to the dot recorded previously; and control means which, in the case where it is determined by the discriminating means that the obliquely located dot exists, makes a drive of this dot different from an ordinary drive, thereby enabling this obliquely located dot to be recorded for a slightly longer recording time. With this apparatus, particularly, an oblique line can be smoothly and sharply recorded so that a recording quality of a character, figure or the like is greatly improved.

11 Claims, 4 Drawing Figures

RECORDING APPARATUS

This application is a continuation of application Ser. No. 704,931 filed Feb. 25, 1985 now abandoned.

BACKGROUND OF THE INVENTION

1. Field of the Invention

The present invention relates to a recording apparatus for recording by use of a plurality of dots and, more particularly, to a recording apparatus or method which intends to improve sharpness in recording.

The recording method or apparatus according to the present invention can be applied to, for example, a serial printer head, line head or the like which forms a desired pattern by a plurality of dots.

2. Description of the Prior Art

In a recording method whereby a character, figure or the like is formed by a large number of dots, the number of dots is an important factor for sharpness in recording. This is because the recording becomes fine and sharp when the number of dots is large, while the recording becomes rough and unsightly when the number of dots is small.

However, in a conventional recording method, particularly in case of recording an oblique line, if the number of dots is small, each dot is separately printed from one another so that there is a drawback such that the oblique line resembles a stairway and the recording becomes extremely unsightly.

SUMMARY OF THE INVENTION

The present invention is made in consideration of the foregoing conventional drawback and intends to provide a recording method whereby even in a case where the number of dots is small, recording can be performed, particularly an oblique line can be smoothly and sharply formed. In the recording method of the invention, the dots to draw an oblique line, in particular, are made slightly long, thereby providing a recording apparatus in which the oblique line becomes smooth and sharp and a recording quality of a character, figure or the like is largely improved.

Another object of the invention is to provide a recording apparatus for forming a pattern by a dot matrix, comprising: discriminating means for discriminating to see if a dot which exists in a dot series to be recorded next is located obliquely to the dot previously recorded or not; and control means which, when it is determined by the discriminating means that there exists a dot that is obliquely located, makes a drive of this dot different from an ordinary drive.

DETAILED DESCRIPTION OF THE PREFERRED EMBODIMENT

An embodiment of the present invention will now be described in detail hereinbelow with reference to the drawings.

Figure 1:
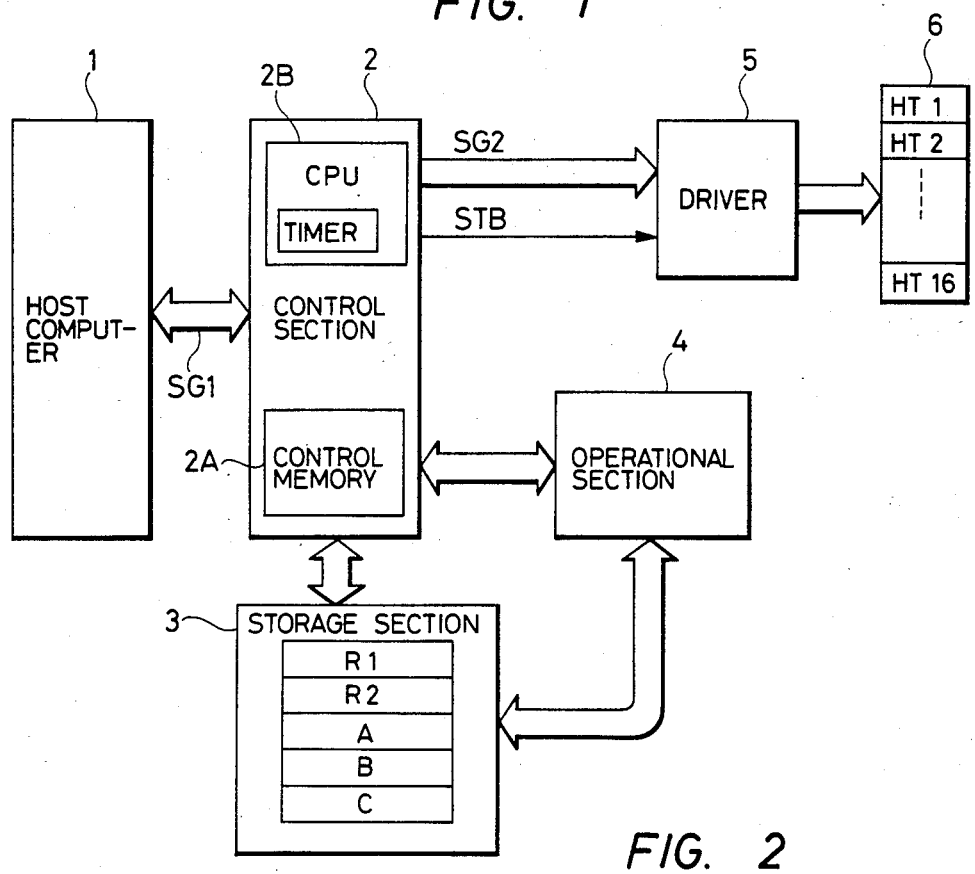
FIG. 1 is a block diagram of a thermal printer which embodies one embodiment of a recording method according to the present invention.

FIG. 1 is a block diagram of a thermal printer which embodies one embodiment according to the invention. However, in the embodiment, a case where the number of exothermic dots is sixteen is adopted and the invention is not limited to this.

In FIG. 1, an external host computer 1 and a control section 2 to control the operation of the printer are connected by a signal line SG1 and data is outputted to the control section 2 on a 16-bit unit basis.

Figure 3A:
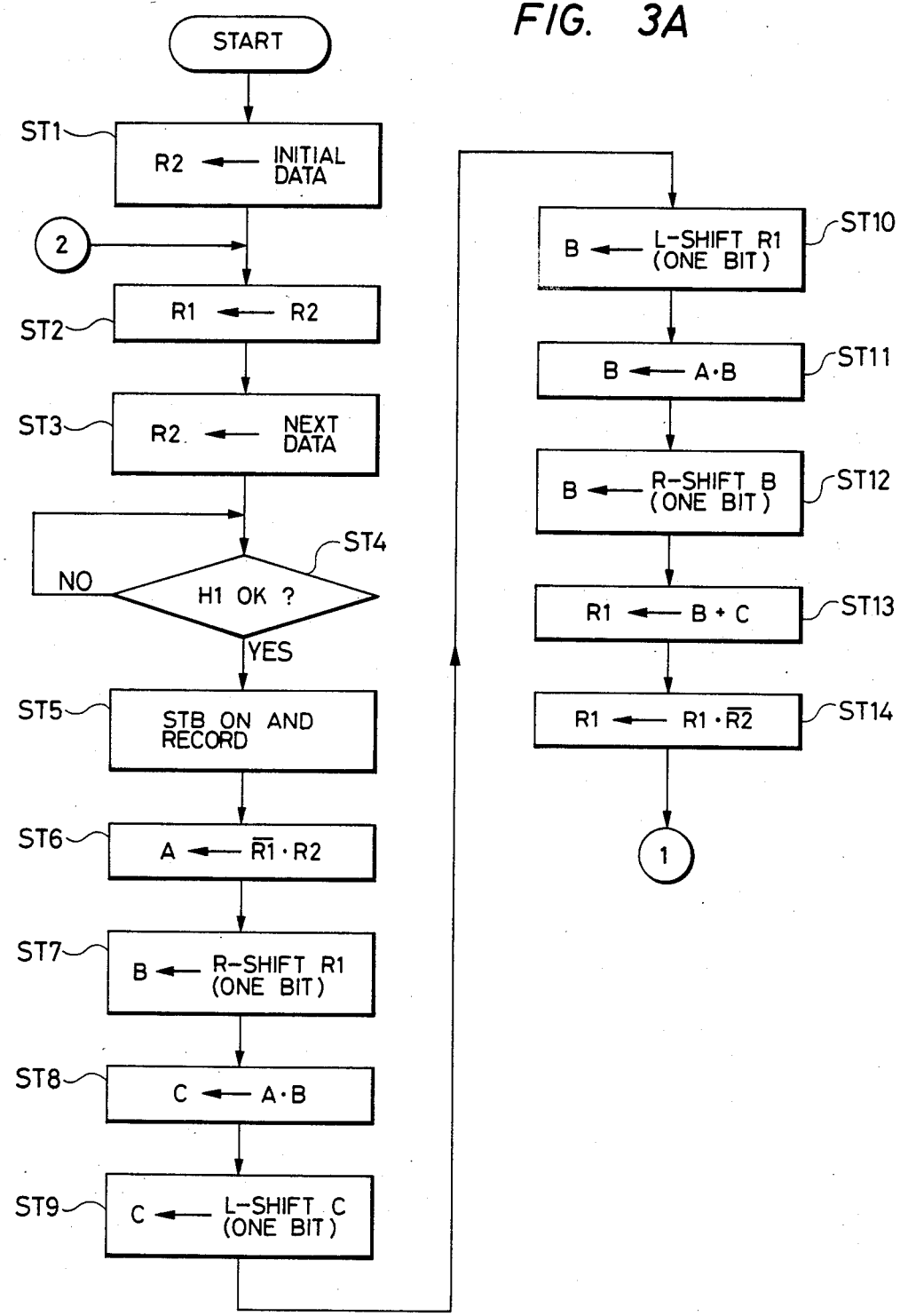
FIGS. 3A and 3B are flowcharts for the present embodiment.
Figure 3B:
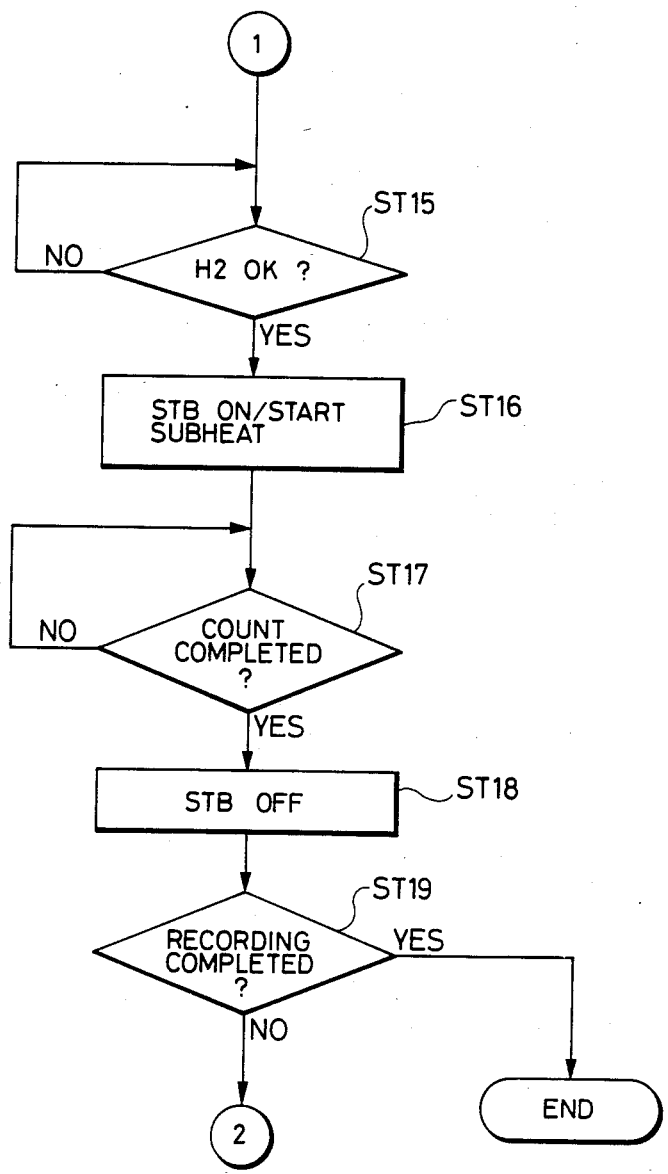

The control section 2 has a control memory 2A in which a control procedure as shown in FIGS. 3A and 3B has been stored and a processing section CPU 2B which executes the procedure stored in this control memory and has a timer to count a time.

The control section 2 is connected to a storage section 3 and an operational section 4. Further, the storage section 3 and operational section 4 are also connected with each other. In the embodiment, the storage section 3 is provided with five 16-bit shift registers (R1, R2, A, B, C).

The control section 2 is connected to a driver 5 through a signal line SG2 and a strobe control line STB. The driver 5 is connected to heating element (HT1 to HT16) of a head 6, respectively.

The operation of the printer having such an arrangement will then be explained with reference to the drawings.

Figure 2:
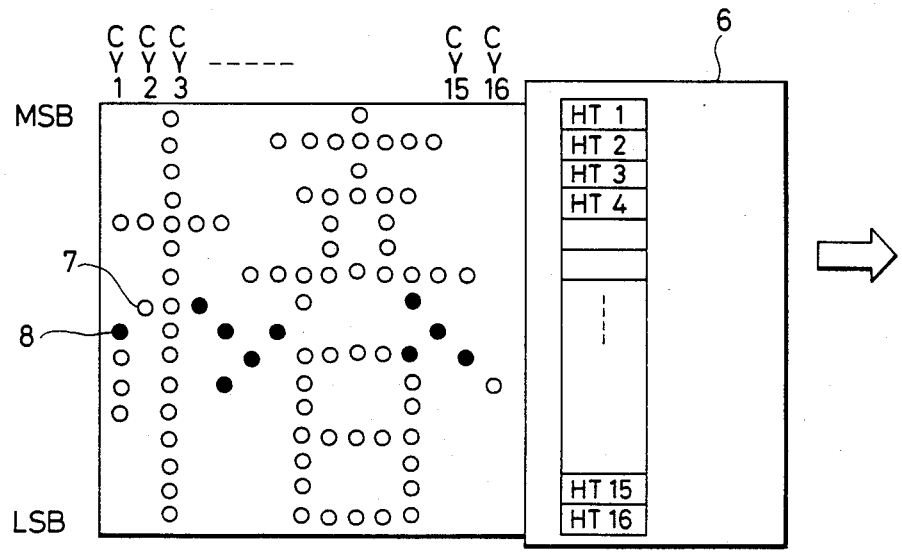
FIG. 2 is an explanatory diagram schematically showing a record data and the result of recording thereof.

FIG. 2 is an explanatory diagram schematically showing data and the result of recording thereof. FIGS. 3A and 3B are flowcharts of the embodiment. In FIG. 2, the data in each cycle (hereinafter, referred to as CY) is constituted by sixteen bits. The heating of the corresponding heating elements HT1 to HT16 is determined in dependence upon a level of each bit, namely, whether it is at a high level "1" or low level "0". In the embodiment "1" denotes the heating and an explanation will be made herein below by assuming that the bit in each CY corresponding to the heating element HT1 is the MSB (most significant bit) and the bit corresponding to the HT16 is the LSB (least significant bit).

First, when initial data of 16 bits (CY1 in FIG. 2) is inputted from the host computer 1 through the signal line SG1 to the control section 2, the control section 2 stores the data CY1 into the register R2 (ST1 in FIG. 3A). Subsequently, the data CY1 stored in the register R2 is transferred into the register R1 (ST2) and a next data CY2 is stored into the register R2 (ST3).

The control section 2 checks to see if it may drive (main heat H1) the head 6 or not to record the data CY1 stored in the register R1 (ST4). If the main heat H1 can be performed (YES in ST4), the control section 2 reads out the data CY1 from the register R1 and transmits it to the driver 5 through the signal line SG2 and simultaneously makes a strobe signal STB active to allow the heating elements HT1 to HT16 to be heated in accordance with the heating dot pattern corresponding to the data CY1, thereby performing the recording (ST5).

Next, the control section 2 executes the operation to extract the dots which are subjected to a subheat H2 from the data CY1 at this time.

First, the present data CY1 stored in the register R1 is transferred to the operational section 4, by which the content of each bit is inverted (hereinbelow, referred to as $\overline{R1}$). Next, a calculation is made to get AND of the content of each bit of the data CY2 at the next time stored in the register R2 and the previous content of R1 and the result of calculation is stored in the register A (ST6). Thus, the content of which the bits which allow the heating elements at the same positions as the present data CY1 to heat among the data CY2 at the next time were set to "0" is stored in the register A. In this case, only dot 7 is set to "1".

Subsequently, the control section 2 outputs a shift pulse to the register R1 and permits the present data CY1 stored in the register R1 to be shifted to the right by only one bit and stores the content into the register B (ST7). Namely, in FIG. 2, the present data CY1 is shifted to the side of the LSB by one bit.

Then, AND of the content of each bit stored in the register A and the content of each bit stored in the register B is calculated and the result of calculation is stored in the register C (ST8). In this case, since a comparison is made with respect to the CY1 and CY2, the contents of the register C are all "0".

Then, the control section 2 outputs a shift pulse to the register C, thereby allowing the content of the register C to be shifted to the left (the side of the MSB) by only one bit (ST9).

The bits such that the bits of "1" stored in the register A exist at the lower oblique positions of such bits among the present data CY1 stored in the register R1 are extracted due to the processes in ST7 to ST9 as described above and are stored in the register C. In this case, the dot from which a dot 7 of the data CY2 is seen at the lower oblique position of such dot does not exist in the data CY1, so that the contents of the register C are all "0".

In subsequent steps ST10 to ST12, by a method substantially similar to steps ST7 to ST9, the bits such that the bits of "1" stored in the register A exist at the upper oblique positions of such bits among the present data CY1 stored in the register R1 are extracted and are stored in the register B. In this case, a dot 8 from which the dot 7 of the data CY2 can be seen at the upper oblique position exists in the data CY1, so that the contents of the register B become such that the bit corresponding to the position of the dot 8 is "1" and the other bits are "0".

After that, OR of each bit in the registers C and B is calculated and the result of calculation is stored in the register R1 (ST13). Subsequently, calculation is made to get AND of each bit in the register R1 and the $\overline{R2}$ and the result of calculation is stored in the register R1 (ST14). The content of the $\overline{R2}$ is obtained by inverting each bit in the register R2 in which the data CY2 at the next time has been stored. Due to the process ST14, if the dot of the data CY2 at the next time exists at the same position as that of the dot 8 to be subjected to the subheat H2, this subheat H2 is cancelled.

In this way, the data for the subheat H2 is finally stored in the register R1. In this case, the content of the register R1 is merely such that the bit at the position corresponding to the dot 8 of the CY1 is "1".

Subsequently, the control section 2 checks to see if the subheat H2 can be performed or not (ST15). If it is possible (YES in ST15), the control section 2 makes the strobe signal STB active and also outputs the subheat data stored in the register R1 to the driver 5, thereby starting the subheat (ST16). At the same time, the control section 2 makes the counter provided therein start, thereby counting the count number (NO in ST17). When the count number reaches a predetermined number (YES in ST17), the control section 2 makes the strobe signal STB inactive, thereby finishing the subheat H2 (ST18).

In this way, the subheated dot is recorded slightly longer as compared with the other dots which were merely subjected to the main heat.

Unless the recording is completed (NO in ST19), the data stored in the register R2 is transferred into the register R1 and the next data is also stored into the register R2 (ST2, ST3). In the case, since the data of CY2 has been stored in the register R2, the data of CY2 is set to the data at this time and the data of CY3 is set to the data at the next time due to the process in ST2 and ST3, and the foregoing operations are repeated similarly hereinafter.

As described above, the portions of the oblique lines indicated by the black dots in FIG. 2 are subheated and are smoothly recorded.

In the embodiment, the case where the heating elements are arranged in a longitudinal line has been described. However, it is apparent that the invention can be easily applied even in case of a line head in which the heating elements are arranged in a transversal line.

Further, in the embodiment, the subheat is performed after the main heat. However, the subheat may be executed during or before the main heat or may be carried out separately from the main heat.

In addition, the recording method according to the invention is not limited to only the thermal printer but may be also applied to a wire dot printer or the like.

What I claim is:

1. An apparatus for recording one complete pattern by recording a combination of a plurality of partial patterns in at least one of an ordinary manner and an altered manner, comprising:
    discriminating means for determining whether a partial pattern next to be recorded is located at a predetermined position relative to a partial pattern presently to be recorded; and
    control means for recording said partial pattern presently to be recorded in the altered manner when it is determined by said discriminating means that the partial pattern next to be recorded is located at the predetermined position relative to said partial pattern presently to be recorded.

2. An apparatus according to claim 1, further comprising storing means having a first storage section for storing the partial pattern next to be recorded and a second storage section for storing the partial pattern to be recorded.

3. An apparatus according to claim 2, wherein said discriminating means has processing means for operating the partial pattern next to be recorded and the partial pattern to be recorded in said storing means.

4. An apparatus for forming a pattern by providing a dot matrix including a series of dots recorded in at least one of an ordinary manner and a different manner, the apparatus comprising:
    discriminating means for determining whether a dot in a dot series next to be recorded is located obliquely relative to a dot presently to be recorded; and
    control means for recording said dot in a dot series presently to be recorded in the different manner when it is determined by said discriminating means that the dot in the dot series next to be recorded is located obliquely relative to said dot presently to be recorded.

5. An apparatus according to claim 4, wherein said control means has means for lengthening the recording time of the dot located obliquely to the dot to be recorded to provide the different manner of recording.

6. An apparatus according to claim 4, further comprising a thermal head connected to said control means for recording the dot series.

7. An apparatus according to claim 4, wherein said discriminating means has operating means.

8. An apparatus according to claim 4, further comprising storing means having a first storage section for storing the dot series next to be recorded and a second storage section for storing the dot series to be recorded.

9. An apparatus for forming a pattern by providing a dot matrix including a series of dots recorded in at least one of an ordinary manner and a different manner, the apparatus comprising:

storing means having a first storage section for storing a dot series next to be recorded and a second storage section for storing a dot series presently to be recorded;

detecting means for comparing the dot series stored in said second storage section with the dot series next to be recorded stored in said first storage section to detect any dots in the dot series next to be recorded located obliquely relative to dots in said dot series presently to be recorded; and control means for recording said dots in the dot series presently to be recorded in the different manner when dots are detected by said detecting means.

10. An apparatus according to claim 9, further comprising a thermal head which is connected to said control means.

11. An apparatus according to claim 9, wherein said detecting means has a processing section connected to said storing means.

* * * * *